3,062,826
3,4-DISUBSTITUTED PHENOXYMETHYL OXAZOLIDONES
Carl D. Lunsford, Richmond, Va., assignor to A. H. Robins Company, Inc., Richmond, Va., a corporation of Virginia
No Drawing. Filed June 19, 1959, Ser. No. 821,355
6 Claims. (Cl. 260—307)

The present invention relates to certain 3,4-disubstituted phenoxymethyl oxazolidones and is more particularly concerned with such compounds which are useful as interneuronal blocking agents or depressants of central synaptic transmission.

The compounds of the present invention have the general formula:

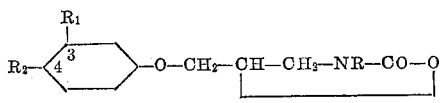

wherein R is hydrogen or a lower-alkyl radical containing up to and including three carbon atoms, wherein $R_1$ is lower-alkyl containing up to and including three carbon atoms, and wherein $R_2$ is halo, e.g., bromo, chloro, or fluoro. The preferred halogen is chlorine.

The compounds of the present invention, characterized by the presence of both an alkyl radical and a halogen-substituent on the phenyl ring, which must be in the particular positions indicated, have been found to have superior activity of the aforementioned type and to be able to block abnormal nervous impulses which give rise to spasm. They show a high measure of activity in standard testing procedures, for example, in the loss of righting reflex, anti-electroshock, anti-strychnine, rotarod, and anti-mescaline (scratch) tests, which activity is indicative of ultimate anticonvulsant, relaxant, tranquilizing and similar clinical use in human beings.

The activity of the compounds of the invention is surprisingly superior to that of the known, and previously most active, 2-monosubstituted phenoxymethyl oxazolidones of an otherwise similar structure, and is correlated with their structural specficity. The fact that they are effective against convulsions induced in various different ways and by different mechanisms, together with their excellent therapeutic ratio and low incidence of undesirable side effects, makes them particularly useful in instances where general anticonvulsant therapy is indicated or desirable, and makes possible a broad approach, using the compounds of the invention, to effect a general blocking or depressing of the interneuronal or synaptic target organs and areas. While the compounds do differ among themselves in the magnitude of their respective activities, they are generally characterized by the types of anticonvulsant activity and other properties indicated in the foregoing.

It is accordingly an object of the present invention to provide certain 3,4-disubstituted phenoxymethyl oxazolidones having the foregoing structure and utility, and processes for the production thereof. Other objects will become apparent hereinafter.

In the formulae herein, lower-alkyl radicals, where present, may be of both straight and branched-chain nature, such as methyl, ethyl, propyl and isopropyl.

The 3,4-disubstituted phenoxymethyl oxazolidones of the invention may be prepared in a number of ways. For example, the phenoxymethyl-2-oxazolidones wherein R in the foregoing formula is hydrogen (and which are therefore unsubstituted at the oxazolidone three nitrogen atom) may be prepared by reacting a selected 3-phenoxy-1,2-propanediol (having the predetermined substituents on the phenyl ring) and urea, preferably in an approximately 1:2 molar ratio, by heating at an elevated temperature, usually 170° C. to 200° C. and preferably at about 185° C., with or without a solvent. A fusion process is preferably employed. The time required for complete reaction is usually at least three hours and the technique of rapidly heating the reaction mixture to the desired reaction temperature is advantageously followed. On completion of the reaction, the crude oxazolidone may be dissolved in a suitable solvent and recovered therefrom for purification purposes by usual procedure. Alternatively, a selected 3-phenoxy-1-chloro-2-propanol may be reacted with urea instead of the phenoxy-1,2-propanediol, using the same molar ratios and under the same reaction conditions.

Moreover, when R is hydrogen, the 3,4-disubstituted phenoxymethyl-2-oxazolidones may also be prepared by reacting a selected 3-phenoxy-2-hydroxy-1-propyl-carbamate and urea, preferably in approximately equimolar quantities, at elevated temperatures, advantageously by heating the reactants together in the temperature range of 170° to 200° C., usually for periods as long as five hours or so for completion of the reaction, and separating the crude oxazolidone. The pure oxazolidone may be obtained by fractional distillation or by crystallization from an oxygenated solvent. The carbamate starting material may in turn be prepared according to known procedure by reacting the selected phenoxy-1,2-propanediol with an equimolar quantity of phosgene in the cold in the presence of an organic amine base, such as pyridine or dimethyl aniline, to produce an intermediate chlorocarbonate compound, which is then reacted with ammonium hydroxide to yield the desired starting carbamate.

The 3,4-substituted 5-phenoxymethyl-3-lower-alkyl 2-oxazolidones (wherein R in the formula is a lower-alkyl radical), are conveniently prepared by aminating the selected phenoxy-1-chloro-2-propanol employing a selected primary amine, such as methylamine, ethylamine, isopropylamine, or the like, according to known procedure, to yield a starting substituted phenoxy-1-amino-2-propanol having a nitrogen substituent corresponding to that desired in the final 5-phenoxymethyl-3-N-substituted-2-oxazolidone. The desired product is prepared by reacting together approximately equimolar quantities of the intermediate N-substituted amino alcohol and a ring closure agent, which may be a dialkyl carbonate, at an elevated temperature, ordinarily about 95–100° C. or thereabout for from fifteen minutes to several hours, in the presence of a basic catalyst such as sodium, potassium, their hydroxides, hydrides, and amides, e.g., sodium ethoxide, potassium hydride, sodium amide, or the like, and preferably in a hydrocarbon solvent. Dialkyl carbonates, particularly di-lower alkyl carbonates, such as dimethyl carbonate, diethyl carbonate, di-n-propyl carbonate, di-n-butyl carbonate, di-sec.-butyl carbonate, and the like, are suitable ring closure agents. Carbonyl chloride may be substituted for the dialkyl carbonate; in such case, a lower temperature, usually below about 35° C., is employed. Starting substituted 3-phenoxy-1-chloro-2-propanols are in turn prepared in conventional manner by condensing the selected substituted phenol with epichlorhydrin. The final 3,4-disubstituted 5-phenoxymethyl-3-N-substituted-2-oxazolidones may be distilled from the reaction mixture, after removal of the hydrocarbon solvent-alcohol azeotrope which forms during the reaction, and recrystallized, or recovered and worked up in other conventional manner.

The following examples are given by way of illustration only, and are not to be construed as limiting.

*Example 1.—5-(4-Chloro-3-Toloxymethyl)-2-Oxazolidone*

A mixture of 0.20 mole of 3-(4-chloro-3-toloxy)-1,2- propane-diol and 24 grams (0.40 mole) of urea was heated at 195–200° C. for five hours and poured into water. The oil was extracted with ethyl acetate, dried over sodium sulfate, filtered and concentrated. A crude yield of solid 5-(4-chloro-3-toloxymethyl)-2-oxazolidone was obtained, which after several crystallizations from ethyl acetate melted at 135–137° C.; M.W. 241.67.

*Example 2.—5-(4-Chloro-3-Toloxymethyl)-
3-Ethyl-2-Oxazolidone*

To a solution of 0.07 mole of 1-ethylamino-3-(4-chloro-3-toloxy)-2-propanol and 8.3 grams (0.07 mole) of ethyl carbonate in 200 ml. of iso-octane was added 0.1 gram of sodium metal. The mixture was stirred and heated at 95–100° C. for two hours while the ethanol-iso-octane azeotrope was allowed to distill out. At the end of the first hour, an additional 0.1 gram of sodium was added. Upon cooling, an oily layer separated and the iso-octane was decanted therefrom. The residue was recrystallized from dry isopropyl ether. The yield was about 40%; melting point 95.5–96 degrees centigrade; M.W. 269.74. The product was subjected to elemental analysis; carbon, hydrogen, and nitrogen content confirmed the structure of the desired product.

The corresponding 4-fluoro and 4-bromo compounds, 5 - (4 - fluoro - 3 - toloxymethyl) - 3 - ethyl - 2 - oxazolidone and 5 - (4 - bromo - 3 - toloxymethyl) - 3 - ethyl-2-oxazolidone, are prepared in exactly the same manner from 1 - ethylamino - 3 - (4 - fluoro and 4 - bromo - 3-toloxy)-2-propanol.

*Example 3.—Other 5-(4-Chloro-3-Toloxymethyl)-
3-Lower-Alkyl-2-Oxazolidones*

In exactly the manner of the preceding example, other 3-N-lower-alkyl oxazolidones are produced by starting with the appropriate 1-substituted amino-3-(4-halo-3-toloxy)-2-propanol, which is in turn prepared by reacting the selected primary amine with the 3-(4-halo-3-toloxy)-1-chloro-2-propanol. In this manner, starting with 1-propylamino or 1 - methylamino - 3 - (4 - chloro - 3-toloxy) - 2 - propanol, the 5 - (4 - chloro - 3 - toloxymethyl) - 3 - propyl - 2 - oxazolidone and 5 - (4 - chloro-3 - toloxymethyl) - 3 - methyl - 2 - oxazolidone are prepared, having a 3-nitrogen hydrocarbon substituent corresponding to that present in the starting 1-substituted amino-3-(4-chloro-3-toloxy)-2-propanol.

*Example 4.—5-(4-Bromo-3-Propylphenoxymethyl)-
2-Oxazolidone*

In exactly the manner of Example 1, the compound 5 - (4 - bromo - 3 - propylphenoxymethyl) - 2 - oxazolidone is prepared by reacting 3-(4-bromo-3-propylphenoxy)-1,2-propanediol (or the corresponding 1-chloro-2-propanol or 2-hydroxy-1-propyl-carbamate) with urea and separating, working up the product, and purifying it in the usual manner.

*Example 5.—5-(4-Fluoro-3-Toloxymethyl)-2-Oxazolidone and 5-(4-Bromo-3-Toloxymethyl)-2-Oxazolidone*

In exactly the manner of Example 1, the compounds 5 - (4 - fluoro - 3 - toloxymethyl) - 2 - oxazolidone and 5 - (4 - bromo - 3 - toloxymethyl) - 2 - oxazolidone are prepared by reacting 3 - (4 - fluoro - 3 - toloxy) - 1,2-propanediol or 3 - (4 - bromo - 3 - toloxy) - 1,2 - propanediol (or the corresponding 1 - chloro - 2 - propanols or 2-hydroxy-1-propyl-carbamates) with urea and separating, working up the product, and purifying it in the usual manner.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A 3,4-disubstituted phenoxymethyl oxazolidone compound of the formula

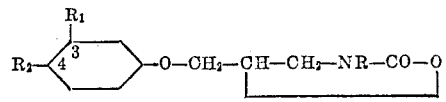

wherein R is selected from the group consisting of hydrogen and lower alkyl containing a maximum of three carbon atoms, wherein $R_1$ is lower-alkyl containing a maximum of three carbon atoms, and wherein $R_2$ is a halogen atom having an atomic weight up to eighty.

2. 5 - (4 - halo - 3 - toloxymethyl) - 2 - oxazolidone, wherein the 4-halo atom has an atomic weight up to eighty.

3. 5-(4-chloro-3-toloxymethyl)-2-oxazolidone.

4. 5 - (4 - halo - 3 - toloxymethyl) - 3 - lower - alkyl-2-oxazolidone, wherein the 3-lower-alkyl radical contains a maximum of three carbon atoms and wherein the 4-halo atom has an atomic weight up to eighty.

5. 5 - (4 - chloro - 3 - toloxymethyl) - 3 - lower - alkyl-2-oxazolidone, wherein the 3-lower-alkyl radical contains a maximum of three carbon atoms.

6. 5 - (4 - chloro - 3 - toloxymethyl) - 3 - ethyl - 2-oxazolidone.

References Cited in the file of this patent

UNITED STATES PATENTS 2,895,960    Lunsford _____ July 21, 1959

OTHER REFERENCES

Lynn: Organic Chemistry (Lea and Febiger, 3rd ed.), pages 186–189 (1948).

Am. Cyanamid (Australian Abstract), 42,986/58, May 7, 1959.

Beasley et al.: Chem. Abstracts, vol. 51, col. 8723 (1957).

Blajot et al.: 743 O.G. 933, June 23, 1959.